(12) United States Patent
Radtke (10) Patent No.: US 7,411,153 B2
(45) Date of Patent: Aug. 12, 2008

(54) REMOVABLE PANELS FOR A WELDING-TYPE MACHINE ENCLOSURE

(75) Inventor: David E. Radtke, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 714 days.

(21) Appl. No.: 10/249,018

(22) Filed: Mar. 10, 2003

(65) Prior Publication Data

US 2004/0178182 A1    Sep. 16, 2004

(51) Int. Cl.
| B23K 9/10 | (2006.01) |
| A47B 81/00 | (2006.01) |
| E05D 7/10 | (2006.01) |
| E05D 1/00 | (2006.01) |

(52) U.S. Cl. .............. 219/130.1; 312/290; 16/266; 16/268; 16/355

(58) Field of Classification Search ................ 219/133, 219/130.1; 290/1 A; 312/257.1, 283, 286, 312/290; 16/355, 266, 268

See application file for complete search history.

(56) References Cited

U.S. PATENT DOCUMENTS

| 2,302,661 A | * | 11/1942 | Benson | 16/267 |
| 2,770,833 A | * | 11/1956 | Drechsel | 16/255 |
| 4,852,213 A | * | 8/1989 | Shewchuk | 16/266 |
| 5,734,148 A | * | 3/1998 | Latvis et al. | 219/133 |
| 5,928,535 A | * | 7/1999 | Trinkner et al. | 219/133 |
| 6,186,357 B1 | * | 2/2001 | Kyle | 220/841 |
| 6,585,484 B2 | * | 7/2003 | Rosenthal et al. | 415/201 |
| 6,687,956 B1 | * | 2/2004 | Foo | 16/269 |

OTHER PUBLICATIONS

Miller Electric Manufacturing Company, Bobcat 250 NT Owner's Manual, Oct. 2002, Appleton, WI.

* cited by examiner

*Primary Examiner*—Kevin P Kerns
(74) *Attorney, Agent, or Firm*—Ziolkowski Patent Solutions Group, SC (57) ABSTRACT

A hinge arrangement for a welder enclosure includes a door panel having at least one hinge at one end that is engagable in a slot of a base to allow the door panel to move between a maximum closed position to a maximum open position. The hinge and slot arrangement of the door panel and base allow the door panel to open and close through a rotation point from a maximum open position to a maximum closed position, and also allows complete removal of the door panel at certain positions between the maximum open position and the maximum closed position.

28 Claims, 4 Drawing Sheets

REMOVABLE PANELS FOR A WELDING-TYPE MACHINE ENCLOSURE

BACKGROUND OF INVENTION

The present invention relates generally to welding-type machines and, more particularly, to a welding-type machine enclosure that incorporates removable panels for easy access into the welding-type machine.

A typical welding-type machine includes an electric generator, a prime mover for rotating the generator to produce electrical power, and various electrical components that convert the power from the generator into power suitable for welding. The generator, prime mover, and electrical components are usually assembled into an enclosure having a base, a top wall, two end walls, and two side walls. A horizontal center wall divides the enclosure into an engine compartment and an electrical compartment. The base, top wall, center wall, and end walls normally stay permanently in place after manufacture of the welding-type machine. On the other hand, to provide access to the engine and electrical compartments the enclosure side walls may be removable.

Prior enclosures for welding-type machines have employed side panels that were hinged to the top wall. Those side panels were satisfactory to the extent that they allowed easy access to the engine and electrical compartments. However, the hinged side panels required a great deal of space between the welding-type machine and any adjacent objects or building walls. Consequently, the placement of the welding-type machine was limited to locations having sufficient adjacent space to enable the side panels to be opened.

Therefore, it would be desirable to improve the design of the welding-type machine enclosure so that operators can remove the side panels and have easy access to the engine and electrical compartments of the welding-type machine.

BRIEF DESCRIPTION OF INVENTION

The present invention solves the aforementioned problems by providing side panels that are installed on, and easily removable from, the welding-type machine within a minimum space. In addition, the side panels are installed on the welding-type machine for selectively opening and closing and providing access to the inside of the welding-type machine.

Accordingly, one aspect of the present invention includes a welding-type machine having a base and a welding power supply mounted to the base and configured to deliver electrical power at levels sufficient to weld metal. A plurality of side panels is attached to the base and a top cover is coupled to the plurality of side panels to form an enclosure. At least one side panel is removably attached to the base for selectively opening and closing and providing access to the inside of the enclosure.

In accordance with another aspect of the invention, a welding apparatus having a base including a floor and first and second walls extending upwardly from the floor are provided. Each wall has a horizontal ledge with a plurality of slots therethrough. A welding power supply is mounted to the base and is configured to deliver electrical power at levels sufficient to weld power. Four side panels are attached to the base, two of which are attached to the first wall of the base and the other two are attached to the second wall of the base. A top cover is coupled to the four side panels to form an enclosure. At least two side panels are selectively removable from the base to provide access to the inside of the enclosure.

Each of the two removable side panels has a first end and a second end. The first end of each removable side panel has two hinge tangs spaced apart from one another and integrally attached thereto. Each hinge tang defines a generally S-shaped configuration. The hinge tangs of each panel are insertable into each of the plurality of slots to allow the side panel a) to rotate away from the base when opening the enclosure and b) to rotate toward the base when closing the enclosure, while allowing selective disengagement from the base. The selective disengagement allows the panels to be completely removed from the welder without the use of any tools and without screwtype fasteners. A latch is pivotally installed to the second end of the panel to hold the side panel to the top cover.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
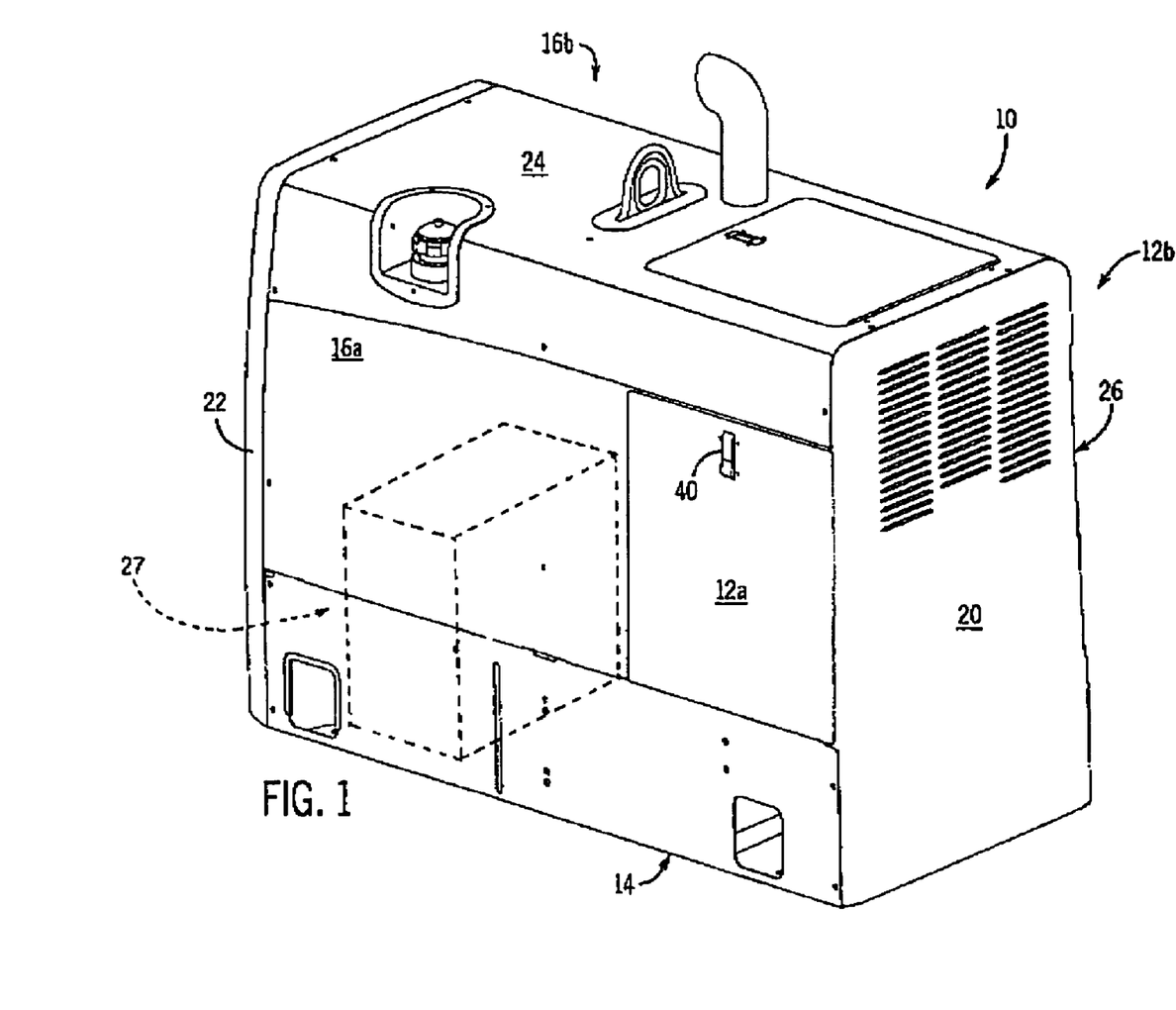
FIG. 1 is a perspective view of a welding-type machine incorporating side panels constructed in accordance with the present invention and illustrating the side panels in a closed position.

FIG. 1 is a perspective view of a welding-type machine 10, incorporating a pair of removable panels, where one removable panel 12a is shown in a closed position and another removable panel 12b (not shown) is on an opposite side of the welding-type machine 10. The welding-type machine 10 is merely representative of a wide variety of welding type machines having various sizes, features, and ratings.

The welding-type machine 10 includes a base 14, four side panels, two of which are removable side panels 12a and 12b, and two of which are fixed side panels 16a and 16b (not shown), welding-type machine, back panel 20, and a front panel 22 (not shown), all attached to the base 14. A top cover 24 is secured to the plurality of side panels to form an enclosure 26. While all these components are shown and described as individual, distinct components, it is understood that these components, or any combination thereof may be constructed as a unitary system or unitary panels. For example, the fixed side panels 16a, 16b may be formed integrally with the top cover 24 and/or the bases 14. Similarly, the front and back panels 22, 20 may be formed with the base 14 and/or the side panels.

Enclosed in the enclosure 26 is a welding power supply 27 as well as a prime mover such as an engine (not shown) to drive a generator. Electrical power from the generator is converted by various electrical components into power suitable for welding, as well known in the art.

Figure 2:
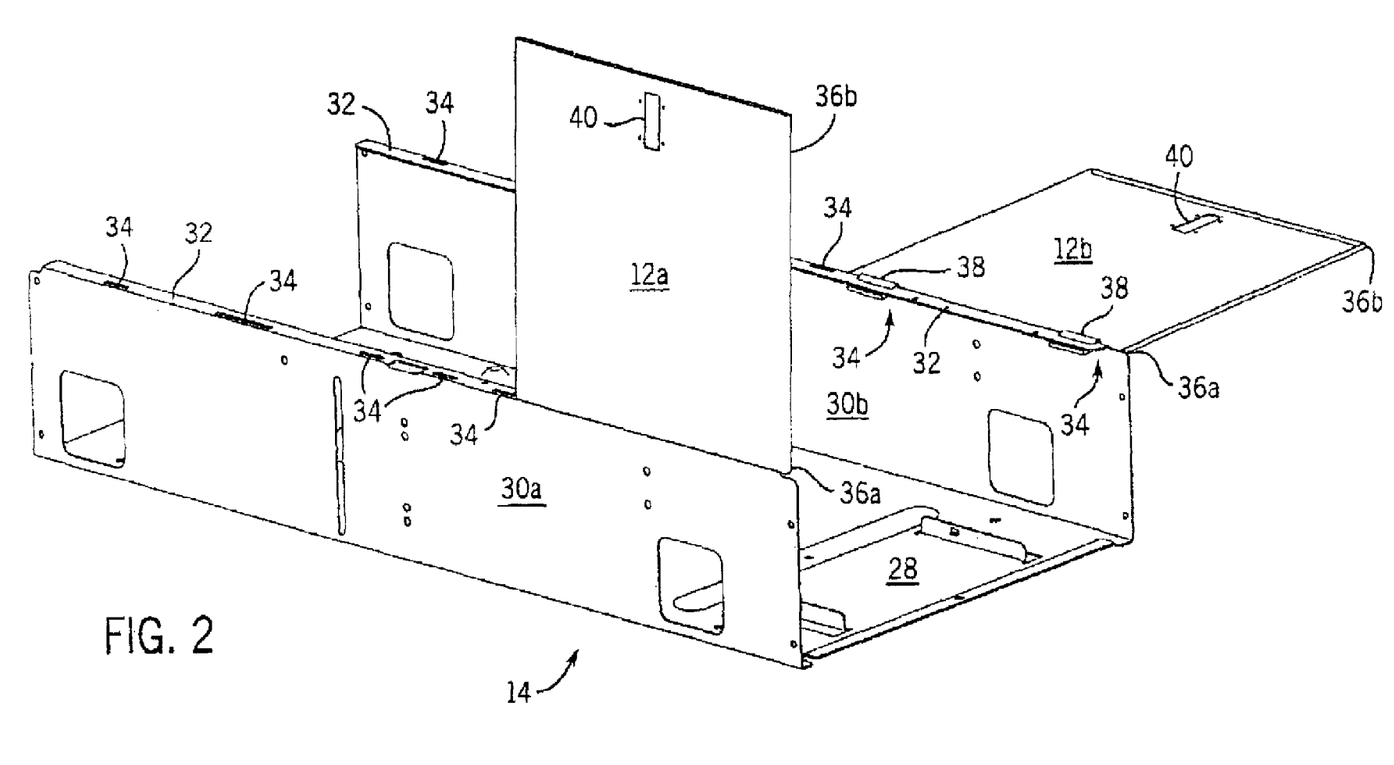
FIG. 2 is perspective view of a base of FIG. 1 illustrating one side panel in a closed position and another side panel in an opened position.

FIG. 2 is a perspective view of the base 14 of FIG. 1 illustrating one removable side panel 12*a* in a closed position and another removable side panel 12*b* in an opened position. The other two side panels 16*a* & 16*b* (not shown) are affixed to the base during construction. The panels 12*a/b*, 16*a/b*, 20, 22 and the top cover 24 are preferably fabricated from blank sheet metal as is well known in the art. The base 14 has a floor 28 and first and second walls 30*a* & 30*b* extending upwardly from the floor. Each wall 30*a/b* has a horizontal ledge 32 which is formed by bending the top portion of the walls 30*a/b*. At least one, and preferably several, slots 34 are formed in each of the ledges and are spaced apart from one another for assembly of fixed side panels 16*a* and 16*b* to base 14 and assembly of removable side panels 12*a*, 12*b* to base 14.

Side panels 12*a* & 12*b* are removably attached to the first and second walls 30*a* & 30*b*, respectively. Each of the side panels 12*a* & 12*b* includes first and second ends 36*a* & 36*b*. At least one hinge tang 38, but preferably two hinge tangs, 38 are integrally attached to the first end 36*a* of each side panel 12*a*, 12*b*. Each hinge tang 38 is inserted into a respective slot 34 to removably and rotatably retain the side panels 12*a* & 12*b* to the base 14. A latch 40 is pivotally installed to the second end 36*b* of each side panel 12*a*, 12*b* to hold the side panels 12*a*, 12*b* to the top cover 24 when in a closed position, as shown in FIG. 1. The removable side panels 12*a* & 12*b* are rotatable at an angle between about 0 to about 90 degrees with respect to the base 14. In the illustrated construction, side panel 12*a* is at about 0 degrees to the first wall 30*a*, or 90 degrees to the floor 28. Side panel 12*b* is at about 90 degrees with respect to the second wall 30*b*, or 0 degrees to the floor 28.

Figure 3:
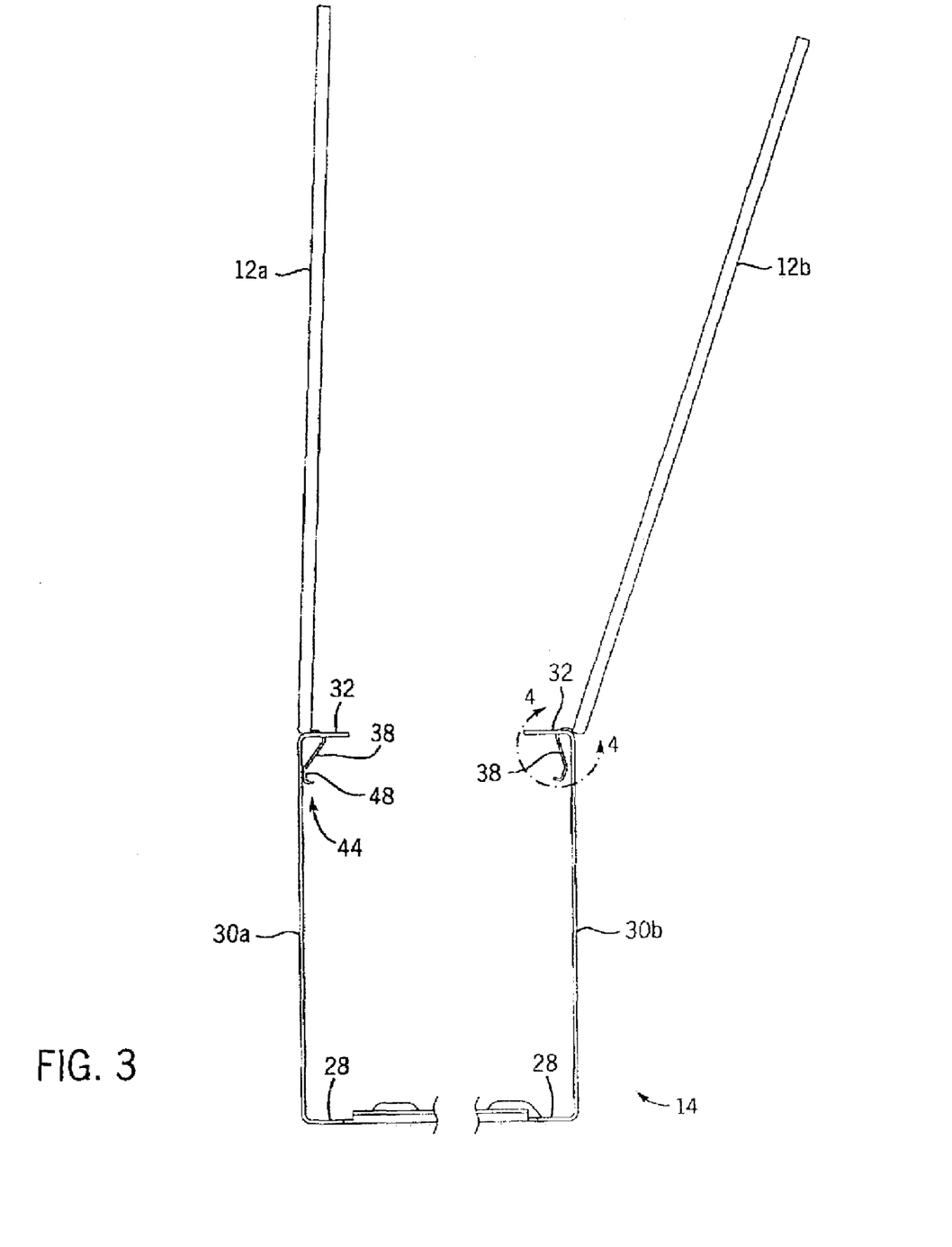
FIG. 3 is an end view of the base of FIG. 2 illustrating one side panel in the closed position and another side panel in a partially open position at an angle allowing side panel removal from the base.

FIG. 3 is an end view of the base 14 of FIG. 2 illustrating side panel 12*a* in a closed position and side panel 12*b* at an angle to allow removal of the side panel 12*b* from the base 14. Each of the side panels 12*a* & 12*b* are removable from the base at a preferred extraction angle ranging from about 1 degree to about 70 degrees with respect to the walls 30*a*, and 30*b* of base 14. However, the side panels 12*a* & 12*b* are prevented from being removed at any angle other than the extraction angle. In the preferred embodiment, the side panels 12*a* and 12*b* are restricted from at least about 70 to about 90 degrees, or the maximum opening, angle allowed. This permits the panels to be completely opened without removal to allow an operator or maintenance personnel to access the interior of the welder 10 without fearing that the panel will fall out. That is, unless the operator or maintenance personnel intend to remove the panel, the panel is constructed to perform as a fixed hinged door. However, should the operator or maintenance personnel desire unfettered access to the interior of the welder 10, the panels may be completely removed, as will be discussed in detail with reference to FIGS. 4 & 5.

Still referring to FIG. 3, as previously described, each of the side panels 12*a* & 12*b* includes at least one hinge tang 38 that has a generally S-shaped configuration. In the illustrated construction, the S-shaped configuration of the hinge tangs 38 allows each side panel 12*a*, 12*b* to rotate away from the base when opening the enclosure. Similarly, when closing the panels, the hinge tangs 38 allow the side panels 12*a*, 12*b* to rotate toward the base 14 without disengaging from the base walls 30*a*, 30*b*.

For example, when the side panel 12*a* is in a closed position, as shown in FIG. 3, the hinge tang 38 is pressed against the wall 30*a* and is prevented from rotating beyond 0 degrees. However, when the side panel 12*a* or 12*b* is at the extraction angle (i.e., from about 1 degree to about 70 degrees with respect to the wall 30*b*, in a preferred embodiment) wherein the side panel is permitted to be removed from the base, the hinge tangs 38 are free from contact with the walls 30*a* or 30*b* and are generally within a recess or opening of a respective slot 34, and therefore, the side panel can be easily extracted or removed from the base 14.

Figure 4:
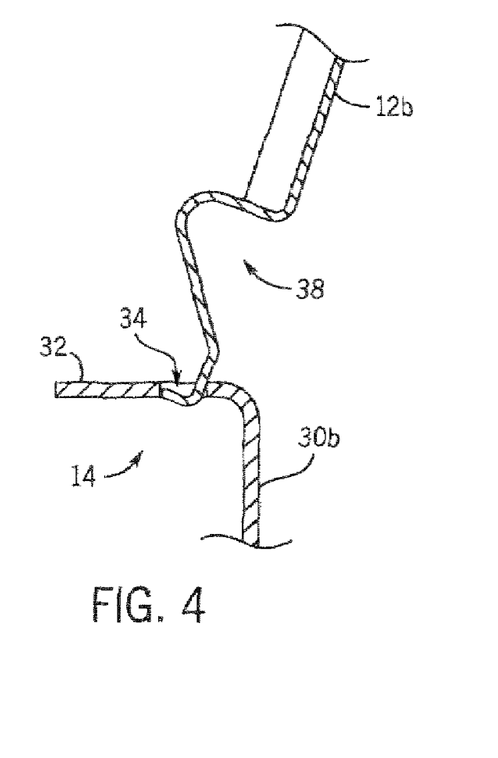
FIGS. 4 & 5 are enlarged cross-sectional views taken along line 4-4 of FIG. 3 illustrating hinge details and removal of a side panel from the base.
Figure 5:
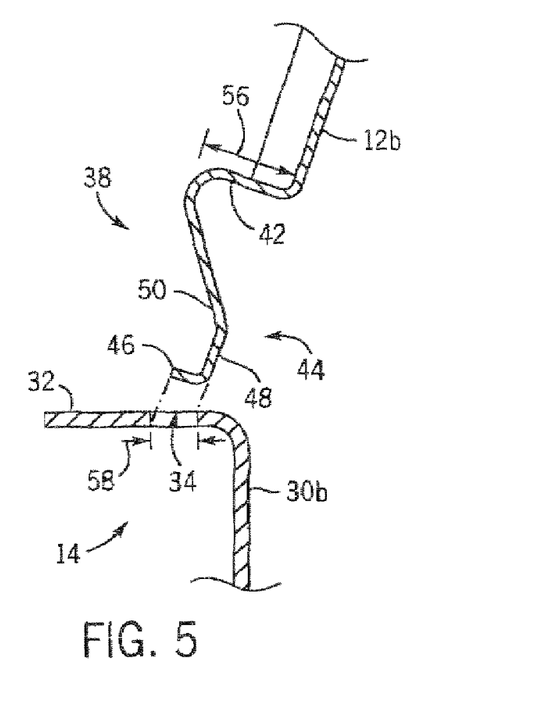

FIG. 4 is an enlarged cross-sectional view taken along line 4-4 of FIG. 3 illustrating the removability of the side panels at the extraction angle that allows the panels to be removed from the base. It should be noted that the relative size and shape of the slot and the S-shaped configuration are factors in determining the extraction angle for installing and removing the side panels from the base. For example, as depicted in FIGS. 3 & 4, the side panel 12*b* is tilted at an extraction angle of about 20 degrees with respect to the wall 30*b* of base 14. While FIG. 3 shows the panel 12*b* in a partial open position, the panel is still engaged with the base 14. However, as shown in FIG. 4, the tang 38 is aligned with the opening of slot 34 to allow the panel 12*b* to be extracted from the base 14 by pulling up on the side panel 12*b*. FIG. 5 shows the completion of the extraction of panel 12*b* as it is shown completely removed from the base 14 and may be set aside for unfettered access to the welder-type machine 10.

Figure 6:
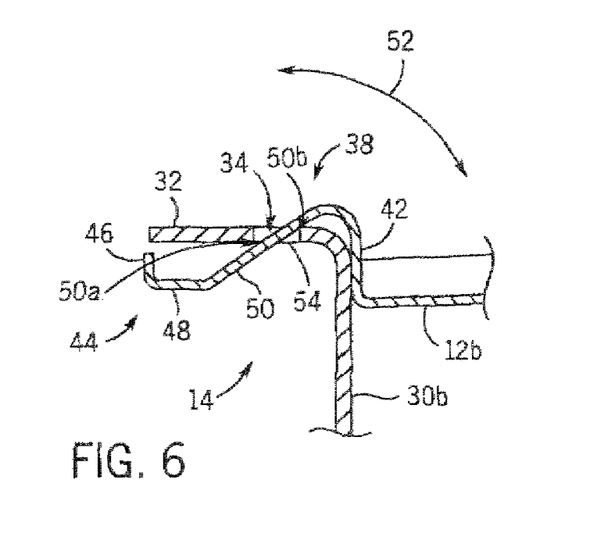
FIG. 6 is an enlarged cross-sectional view taken along line 4-4 of FIG. 3, similar to FIGS. 4 & 5, but illustrating the hinge in an open position.

Conversely, FIG. 6, which follows from FIG. 3, shows the panel 12*b* in a maximum open position with the panel 12*b* locked to the base 14 just as panel 12*a* is locked to the base 14 as shown in FIG. 3 in a maximum closed position. As shown in FIG. 3, panel 12*b* is in a partial open position and is at an extraction angle, but is not being lifted out of the slot 34, so allowing the panel to continue its downward travel, maintains the tang 38 within slot 34 until it reaches the maximum opened position shown in FIG. 6. The open position is defined by the hinge tang 38 pressed against the horizontal ledge 32 at two distinct weight bearing points 50*a*, 50*b* on transition portion 50 when the side panel 12*b* is laid down and at rest, thereby preventing removal of the side panel from the base 14. In the illustrated construction, the side panel is positioned at about 90 degrees with respect to the wall 30*b* of base 14 and the hinge tang 38 is pressed against the horizontal ledge 32 so that the side panel 12*b* is not rotated beyond 90 degrees.

As described above, the S-shaped configuration of the hinge tangs 38 and the size of the slots 34 are designed to cause geometric interference between the slot and hinge tangs when the side panels are not at an extraction angle. One skilled in the art will now readily recognize that the extraction angle can be set at virtually any angle, or set of angles, between the maximum closed position and the maximum opened position. Additionally, the range that the extraction angle covers is equally adjustable based on the size of the slot and the configuration of the tang. As such, the present invention is directed to a side panel that is selectively removable from the structure.

Referring back to FIG. 5, the hinge tang 38 will now be described in detail. Hinge tang 38 includes a hinge portion 42 that is generally perpendicular to the door panel 12 and is arranged generally at an upper end of the hinge tang 38. A doorstop 44 is arranged at a lower end of the hinge tang 38. The doorstop 44 includes an open stop 46 and a closed stop 48. The open stop 46 is generally perpendicular to the door panel 12, and the closed stop 48 is generally parallel to the door panel 12. The open stop 46 extends perpendicularly from the closed stop 48. The doorstop 44 is connected to the hinge portion 42 via a transition portion 50 that is arranged generally at a 45 degree angle to the door panel 12.

The doorstop 44 is engagable with two different portions of the base 14 to define the maximum open position and the maximum closed position. As shown in FIG. 6, door panel 12b is in the maximum open position and the open stop 46 of doorstop 44 is engaged with horizontal ledge 32 of base 14 to, in part, define the maximum open position. In addition, hinge portion 42 is abutted against wall 30b of base 14 to provide additional support for the door panel 12b when opened. As is evident, door panel 12b rotates along arc 52 about a pivot point, or rotation point, 54. As best shown in FIG. 3, the maximum close position is shown with reference to door panel 12a. When in the maximum closed position, the closed stop 48 of the doorstop 44 is abutted up against wall 30a of base 14.

This hinge arrangement forms an angle of extraction of the door panel 12 measured with respect to the vertical, or the horizontal, of the base 14. The hinge and slot provide removability of door panel 12 from the slot, and therefore from the base, anywhere in a range of angles defined by the angle of extraction, which can be anywhere between the maximum open position and the maximum closed position. However, this arrangement prevents the removal, or extraction, of the door panel 12 from the base 14 when the door is fully opened or fully closed. In a preferred embodiment, the door is prevented from being removed at angles greater than about 70 degrees, from the vertical, and less than 1 degree, also as measured from the vertical. Since the sides of the enclosure are angled inward above the base at about 2 degrees, the angle that the door is allowed to be removed with respect to the stationary panels is about 3 degrees. As indicated in FIG. 5, the width 56 of the hinge portion 42, together with the width 58 of the slot 34 define the range of angles that make up the angle of extraction.

Accordingly, the present invention includes a welding-type machine that has a base with at least one slot therein and a power supply mounted to the base and configured to deliver electrical power. The welding-type machine also includes an enclosure attached to the base having at least one removable side panel constructed to removably attach to the base for selective opening and closing in order to provide access to the inside of the enclosure. The side panel includes first and second ends and at least one hinge attached to the first end. The hinge is insertable into a slot of the base and is arranged to allow removal of the side panel at an extraction angle and retain the side panel to the base at angles other than the extraction angle.

The invention also includes a welding apparatus that has a base, a welding power supply, and a plurality of side panels. The base has a floor, and first and second walls extending upwardly from the floor. The walls have a horizontal ledge with a plurality of slots therethrough. The welding power supply is mounted to the base and configured to deliver electrical power at levels sufficient to weld metal. A plurality of side panels is attached to the first and second walls of the base and a top cover is supplied that is coupled to the side panels to form an enclosure. At least two of the plurality of side panels are selectively removable from the base, and each side panel includes first and second ends and at least one hinge tang spaced apart and integrally attached to the first end of each removable side panel. The hinge tang is insertable into a respective slot of the base.

In a preferred embodiment, the hinge tang is generally S-shaped and the slots are disposed in a face of the horizontal ledge of the base. A construction of the hinge tangs, together with a shape of the respective slot, allows each side panel to rotate about a pivot point without disengaging from the base and further allows removal of the side panel when the side panel is at an angle of extraction with respect to a portion of the base. The side panels are preferably rotatable from a vertical position to a horizontal position.

The invention also includes a hinge arrangement for an enclosure that includes a door panel having a hinge at one end engagable in a slot of a base. The hinge includes a hinge portion that is generally perpendicular to the door panel, a doorstop engagable with at least two portions of the base defines a maximum open position and a maximum closed position, and a transition portion connecting the hinge portion to the doorstop.

A welder-type enclosure is also disclosed that includes a base having a slot therein, a movable door panel disengagable with the base, and a means for allowing the movable door panel to open and close through a rotation point from a maximum open position to a maximum close position and allowing complete removal of the movable door panel only at a position between the maximum open position and the maximum closed position.

The means for accomplishing these functions are, in a preferred embodiment, disclosed with reference to FIGS. 3-6, and include the specific hinge and slot arrangement shown, but also may include any other structure that could reasonably be interpreted to be an equivalent of this structure. One skilled in the art would readily recognize that such an equivalent could include a roller assembly, a bearing assembly, other geometric shapes of the hinge, other geometric shapes of the slot, etc.

As one skilled in the art will readily appreciate, the aforementioned description of welding devices not only includes welders, but also includes any system that requires such enclosures and/or high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

What is claimed is:
1. A welding-type machine comprising:
a base having at least one slot therein; and
an enclosure attached to the base having at least one removable side panel, the at least one removable side panel constructed to removeably attach to the base for selective opening and closing and providing access to the inside of the enclosure, the at least one side panel including:
first and second ends, and
at least one hinge attached to the first end, the hinge having a curved section connected to a transition section, where the curved section positions the transition section at an angle to the removable side panel that allows the at least one hinge to be insertable into the slot in the base and arranged to allow removal of the side panel within a range of extraction angles and retain the side panel to the base at angles outside the range of extraction angles;
wherein the range of extraction angles includes a majority of angles from vertical to horizontal.

2. The welding-type machine of claim 1 further comprising a latch attached to the second end of the side panel and the enclosure to hold the side panel in a closed position against the enclosure.

3. The welding-type machine of claim 1 wherein the base has a floor and first and second walls extending upwardly therefrom, each wall having a horizontal ledge with at least one slot therein, and the enclosure further comprises a plurality of side panels, wherein two side panels are non-movable and two are removably attached to the first and second walls of the base.

4. The welding-type machine of claim 1 wherein the at least one side panel is rotatable about the at least one hinge at an angle between about 0 degrees to about 90 degrees with respect to a vertical wall of the base.

5. The welding-type machine of claim 1 wherein the extraction angle includes angle from greater than 0 degrees to angles less than 90 degrees as measured from a vertical wall extending upward from the base.

6. The welding-type machine of claim 5 wherein the range of extraction angles is from about 1 degree to about 70 degrees.

7. The welding-type machine of claim 3 wherein each of the two removable side panels is prevented from being removed at an angle of about 70 degrees to being fully opened.

8. The welding-type machine of claim 1 wherein the at least one hinge tang includes a pair of hinge tangs, each hinge tang having a general S-shaped configuration engageable with a respective slot in the base.

9. The welding-type machine of claim 8 wherein the hinge tangs are spaced apart from one another, and wherein the pair of hinge tangs allow each side panel to a) rotate away from the base when opening and b) rotate toward the base when closing without disengaging from the base.

10. The welding-type machine of claim 1 wherein the hinge includes a tang and wherein a portion of the hinge tang is abutted against a corresponding wall of the base when the side panel is in a closed position and wherein the hinge tang is abutted against a horizontal ledge of the base when the side panel is in an opened position.

11. A welding apparatus comprising:
a base having a floor and first and second walls extending upwardly therefrom, each wall having a horizontal ledge with a plurality of slots therethrough;
a welding power supply mounted to the base and configured to deliver electrical power at levels sufficient to weld metal; and
a plurality of side panels attached to the first and second walls of the base and a top cover coupled to the plurality of side panels to form an enclosure, at least two of the plurality of side panels selectively removable from the base, each of the at least two side panels including:
first and second ends; and
at least one hinge tang spaced apart and integrally attached to the first end of each removable side panel, the at least one hinge tang including:
a hinge portion that is generally perpendicular to the side panel; and
a transition portion connected to the hinge portion via a radius connection and extending from the radius connection at an angle as compared to the hinge portion such that the transition portion is not perpendicular or parallel to either the hinge portion or the side panel, the transition portion being insertable into a respective slot on the horizontal ledge.

12. The welding apparatus of claim 11 wherein the at least one hinge tang is generally S-shaped and the plurality of slots is disposed in a face of the horizontal ledge of the base, and the angle of the transition portion is approximately 45 degrees.

13. The welding apparatus of claim 11 further comprising a latch connecting the second end of the removable side panel to the top cover.

14. The welding apparatus of claim 11 wherein a construction of the hinge tangs, together with a shape of the respective slot that the hinge tang is insertable therein allows each side panel to rotate about a pivot point without disengaging from the base and allows removal when the side panel is at an angle of extraction with respect to a portion of the base.

15. The welding apparatus of claim 12 wherein the at least one S-shaped hinge tang is generally S-shaped hinge tang is generally S-shaped and engages with the slot to prevent disengaging from the slot during opening and closing of the side panel.

16. The welding apparatus of claim 11 wherein the hinge tang further comprises a doorstop connected to an opposite end of the transition portion and at a lower end of the hinge tang that engages the base to define a maximum panel open position and a maximum panel closed position.

17. The welding apparatus of claim 11 wherein two panels are rotatable from a vertical position to a horizontal position.

18. The welding apparatus of claim 11 wherein each of the two removable side panels is removable from the base at an extraction angle as measured from the base.

19. A hinge arrangement for a welding-type enclosure comprising:
a base constructed to support a welding-type power supply and having a ledge portion having a slot therein;
a door panel having a hinge at one end engagable in the slot of the base, the hinge comprising:
a hinge portion that is generally perpendicular to the door panel;
a doorstop engagable with at least two portions of the base to define a maximum open position and a maximum closed position; and
a transition portion connecting the hinge portion to the doorstop, the transition portion positioned to bear weight of the door panel on two distinct points on the ledge portion of the base about the slot when the door panel is in the maximum open position.

20. The hinge arrangement of claim 19 wherein the doorstop has an open stop and a closed stop.

21. The hinge arrangement of claim 20 wherein the base has a vertical wall and a horizontal ledge, and wherein the open stop is engagable with the horizontal ledge to define the maximum open position and the closed stop is engagable with the vertical wall to define the maximum closed position.

22. The hinge arrangement of claim 19 wherein the transition portion is generally arranged at a 45 degree angle to the door panel.

23. The hinge arrangement of claim 19 wherein the hinge portion is arranged to create an angle of extraction such that when the door panel is at an angle of extraction, as measured with respect to the base, the door panel and hinge are removable from the slot and base.

24. The hinge arrangement of claim 23 wherein the angle of extraction includes a range of angles between the maximum open position and the maximum closed position.

25. The hinge arrangement of claim 19 wherein the hinge is constructed so that the door panel is prevented from removal when the door is at either one of the maximum open position and the maximum closed position.

26. The hinge arrangement of claim 24 wherein the range of angles is defined by a width of the hinge portion and a width of the slot.

27. A welder-type enclosure comprising:
- a base having a slot therein;
- a movable door panel disengagable with the base; and
- a means for allowing the movable door panel to open and close through a rotation point from a maximum open position to a maximum closed position and allowing complete removal of the movable door panel only at a position between the maximum open position and maximum closed position;
- wherein the maximum open position is at about 70 degrees from vertical and the maximum closed position is at about 1 degree from vertical.

28. The welder-type enclosure of claim 27 wherein the enclosure is constructed to generally surround a power supply constructed to deliver a welding-type power.

* * * * *

UNITED STATES PATENT AND TRADEMARK OFFICE
CERTIFICATE OF CORRECTION

PATENT NO. : 7,411,153 B2
APPLICATION NO. : 10/249018
DATED : August 12, 2008
INVENTOR(S) : David E. Radtke It is certified that error appears in the above-identified patent and that said Letters Patent is hereby corrected as shown below:

Col. 8, line 16 (Claim 15), delete "hinge tang is generally S-shaped hinge tang is generally S-shaped" and
substitute therefore -- hinge tang is generally S-shaped --.

Signed and Sealed this

Twenty-eighth Day of October, 2008

JON W. DUDAS
*Director of the United States Patent and Trademark Office*